(12) United States Patent
Hoshisashi et al.

(10) Patent No.: US 6,918,696 B2
(45) Date of Patent: Jul. 19, 2005

(54) TEMPERATURE SENSOR AND METHOD FOR MANUFACTURING THE SAME

(75) Inventors: Akihiko Hoshisashi, Chita-gun (JP); Seizaburou Kawashima, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/752,587

(22) Filed: Jan. 8, 2004

(65) Prior Publication Data

US 2004/0141545 A1 Jul. 22, 2004

(30) Foreign Application Priority Data

Jan. 15, 2003 (JP) ........................ 2003-006903

(51) Int. Cl.[7] .................. G01K 1/08; H01C 17/02
(52) U.S. Cl. .................. 374/208; 29/595; 29/612; 29/613; 29/825; 29/858; 73/866.5; 338/229
(58) Field of Search ................ 374/208, 148, 374/163, 179, 183, 140, 158; 338/28, 229; 29/612, 613, 595, 611, 825, 858, 593, 592.1; 136/233; 73/866.5

(56) References Cited

U.S. PATENT DOCUMENTS

| | | | | |
|---|---|---|---|---|
| 4,042,901 A | * | 8/1977 | Bechtel ...................... 29/612 |
| 4,445,109 A | * | 4/1984 | Naganoma et al. ......... 374/148 |
| 4,630,477 A | * | 12/1986 | Murtland, Jr. ............... 338/28 |
| 4,866,410 A | * | 9/1989 | Deppe et al. ................. 338/28 |
| 5,425,582 A | * | 6/1995 | Asano et al. ................ 374/208 |
| 5,463,375 A | * | 10/1995 | Bauer ......................... 374/208 |
| 5,584,579 A | * | 12/1996 | Asano et al. ................ 374/208 |
| 5,749,656 A | * | 5/1998 | Boehm et al. ................ 338/28 |
| 6,272,735 B1 | * | 8/2001 | Moriwake et al. ............ 29/612 |
| 6,466,123 B1 | * | 10/2002 | Kuzuoka et al. ............ 374/183 |
| 6,592,253 B2 | * | 7/2003 | Nyffenegger et al. ......... 29/612 |
| 6,639,505 B2 | * | 10/2003 | Murata et al. .............. 374/208 |

FOREIGN PATENT DOCUMENTS

JP U-H03-39125 4/1991

* cited by examiner

Primary Examiner—Gail Verbitsky
Assistant Examiner—Stanley J. Pruchnic, Jr.
(74) Attorney, Agent, or Firm—Posz Law Group, PLC

(57) ABSTRACT

A temperature sensor includes a casing having a first part and a second part, a temperature detector for detecting temperature of fluid and a pair of outside wires connecting to the temperature detector. The casing further includes a mold portion and an insert portion. The mold portion is disposed in the first part of the casing. The insert portion is disposed in the second part of the casing, and includes a pair of holes for inserting the outside wires therein. The temperature detector is disposed in the first part of the casing. Each outside wire extends from the second part of the casing to an outside of the casing through the hole.

21 Claims, 3 Drawing Sheets

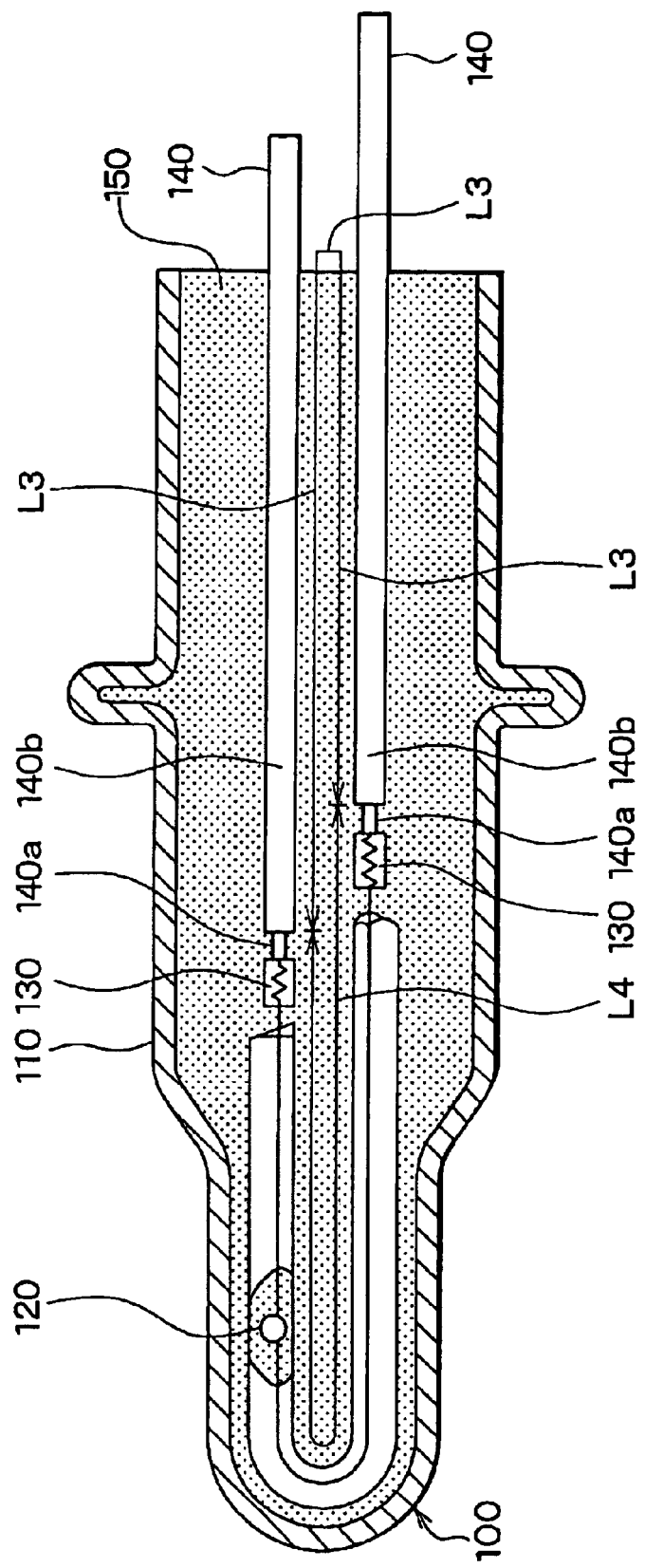

TEMPERATURE SENSOR AND METHOD FOR MANUFACTURING THE SAME

CROSS REFERENCE TO RELATED APPLICATION

This application is based on Japanese Patent Application No. 2003-6903 filed on Jan. 15, 2003, the disclosure of which is incorporated herein by reference.

FIELD OF THE INVENTION

The present invention relates to a temperature sensor for detecting temperature of liquid and a method for manufacturing the same.

BACKGROUND OF THE INVENTION

A temperature sensor for detecting temperature of liquid according to a prior art is disclosed in Japanese Unexamined Utility Model Application Publication No. H03-39125. This sensor 100 is shown in FIG. 3. The sensor 100 is disposed in the liquid so as to detect the temperature of the liquid. The sensor 100 includes a temperature detector 120 connecting to a pair of electric wires 140. The wires 140 extend from a casing 110 of the sensor 100 to the outside of the casing 110. The wire 140 is composed of a lead wire 140*a* coated with an insulation tube 140*b*. The wire 140 connects to the detector 120 at a connection portion 130.

However, the liquid may penetrate into the connection portion 130, so that two wires short-circuit. Therefore, organic sealant is filled in the casing 110 so that a mold portion 150 is formed between the casing and the detector 120 or the wires 140. Since the mold portion 150 is formed, two distances L3, L4 between two connection portions become long. Each distance L3, L4 is defined as a distance between the connection portions 130 along with the wires 140, respectively. Therefore, even if the liquid penetrates between the mold portion 150 and the insulation tube 140*b*, the wires 140 disposed between the connection portions 130 do not short-circuit easily since the distance L3, L4 is long. Here, the organic sealant is made of thermosetting resin such as epoxy resin, so that the mold portion 150 is formed with injecting the resin into the casing 110.

However, the insulation tube 140*b* may be deformed in some cases such as sudden temperature change. The mold portion 150 adheres to the insulation tube 140*b*, so that the mold portion 150 may crack or be damaged because of the deformation of the insulation tube 140*b*. Then, the liquid may penetrate through the crack into the insulation tube 140*b*, so that the wires short-circuit or the mold portion 150 flows out into the liquid as a detection object.

SUMMARY OF THE INVENTION

In view of the above problem, it is an object of the present invention to provide a temperature sensor having high reliability. Specifically, the sensor has a low possibility of short-circuit and no crack in a mold portion.

It is another object of the present invention to provide a method for manufacturing a temperature sensor having high reliability.

A temperature sensor includes a casing having a first part and a second part, a temperature detector for detecting temperature of fluid and a pair of outside wires connecting to the temperature detector. The casing further includes a mold portion and an insert portion. The mold portion is disposed in the first part of the casing. The insert portion is disposed in the second part of the casing, and includes a pair of holes for inserting the outside wires therein. The temperature detector is disposed in the first part of the casing. Each outside wire extends from the second part of the casing to an outside of the casing through the hole.

The above sensor has a low possibility of short-circuit and no crack in the mold portion, so that the sensor has high reliability.

Preferably, the temperature detector includes a detecting device and a pair of inside wires, and the detecting device connects to the outside wires through the inside wires. Here, the insert portion includes a separation portion, and the separation portion extends to the first part of the casing so that the separation portion separates between the inside wires.

More preferably, the casing, the insert portion and the separation portion are made of resin, and are integrated together. In this case, the number of parts composing the sensor can be reduced, so that the manufacturing cost is decreased.

Further, a method for manufacturing a temperature sensor for detecting temperature of fluid is provided. The method includes the steps of forming a casing having a first part and a second part; forming an insert portion integrally together with the casing, wherein the insert portion includes a pair of holes; connecting a pair of outside wires to a temperature detector for detecting the temperature of the fluid; inserting the outside wires into the holes, respectively, so that the outside wires are mounted in the second part of the casing, and the temperature detector is mounted in the first part of the casing after the step of connecting a pair of outside wires; and filling with resin into the first part of the casing so that a mold portion is formed.

The above method provides the temperature sensor, which has a low possibility of short-circuit and no crack in the mold portion. Therefore, the sensor has high reliability.

BRIEF DESCRIPTION OF THE DRAWINGS

The above and other objects, features and advantages of the present invention will become more apparent from the following detailed description made with reference to the accompanying drawings. In the drawings:

FIG. 3 is a cross-sectional view showing a temperature sensor according to a prior art.

DETAILED DESCRIPTION OF THE PREFERRED EMBODIMENT

Figure 1:
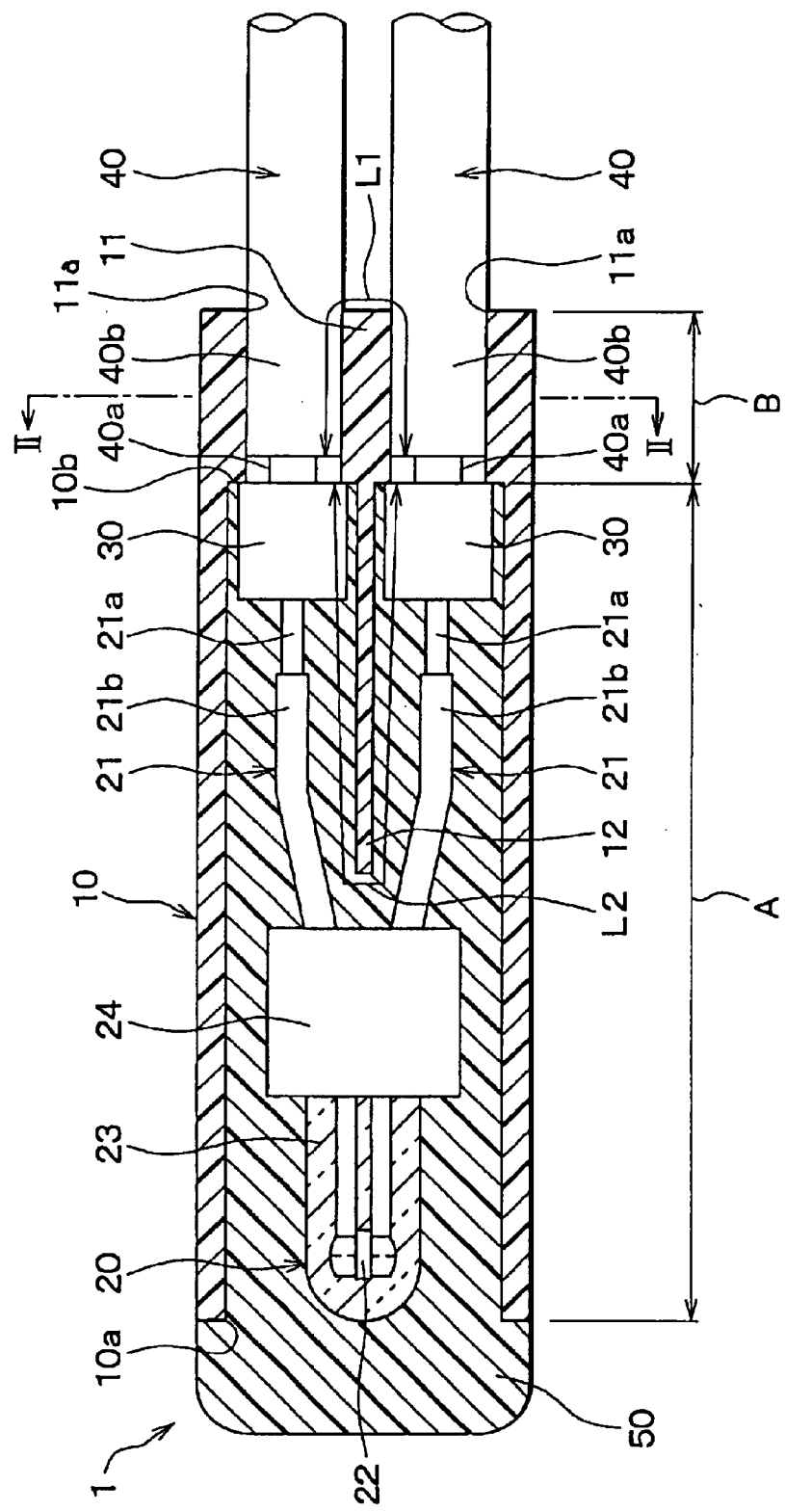
FIG. 1 is a cross-sectional view showing a temperature sensor according to a preferred embodiment of the present invention.

A temperature sensor 1 for detecting temperature of fluid according to a preferred embodiment of the present invention is shown in FIG. 1. The sensor 1 is suitably used for detecting temperature of fuel supplying to an engine of a vehicle. The sensor 1 is mounted in the fuel, and detects the temperature of the fuel. Specifically, the sensor 1 is mounted on a fuel pump disposed in a fuel tank of the vehicle.

The sensor 1 includes a casing 10 having a cylindrical shape. The casing 10 is made of resin such as poly phenylene sulfide (i.e., PPS) resin or poly oxy methylene (i.e., POM) resin. Part of the casing 10, which is shown as A in FIG. 1, is defined as the first part A. The other part of the casing 10, which is shown as B in FIG. 1, is defined as the second part B. The first part A is disposed on the left side of the casing 10, i.e., the top end side of the sensor 1. The second part B is disposed on the right side of the casing 10, i.e., the middle portion of the sensor 1.

In the first part A, a temperature detector 20 is disposed. The detector 20 detects the temperature of the liquid, i.e., the fuel. The detector 20 includes a thermistor 22 as a temperature detecting device. The thermistor 22 connects to two inside electric wires 21, and imbedded in an insulator 23. The insulator 23 is made of glass, which has electric insulation property, and has a bullet shape. The thermistor 22 is mainly made of ceramics, silicon or the like. The resistance of the thermistor 22 is changed in accordance with the temperature change. Each inside electric wire 21 includes a single lead wire 21a covered with an insulation tube 21b.

The inside electric wire 21 extends to a connection portion 30 through a protection tube 24 so that the inside electric wire 21 connects to an outside electric wire 40 with the connection portion 30. The protection tube 24 is made of ceramics, which has an electric insulation property, and has a cylindrical shape. The connection portion 30 is made of metal. The casing 10 includes a protrusion 10b protruding from an inner wall of the casing 10 for reducing an inside diameter of the casing 10. The protrusion 10b contacts the connection portion 30, so that the outside electric wire 40 is prevented from slipping through the casing 10, i.e., the wire 40 is prevented from disconnecting to the connection portion 30.

The outside electric wire 40 includes a conductive wire 40a covered with an insulation tube 40b. The conductive wire 40a is formed with a stranded wire and the like. The outside electric wire 40 is disposed in the second part B of the casing 10. The insulation tube 40b is made of resin such as fluorocarbon resin. Thus, one end of the outside electric wire 40 connects to the connection portion 30, and the other end of the outside electric wire 40 connects to a terminal (not shown), which is made of metal, is disposed outside of the sensor 1, and connects to an electric control unit (i.e., ECU). The ECU calculates the temperature of the fuel on the basis of the resistance change of the thermistor 22.

A mold portion 50 is disposed in the first part A of the casing 10. The mold portion 50 is made of resin such as PPS resin, and formed with filling resin into the casing 10. Accordingly, the detector 20 and the connection portion 30 are disposed in the mold portion 50, so that the resin composing the mold portion 50 fills between the detector 20 or the connection portion 30 and the casing 10.

Thus, the detector 20 and the connection portion 30 is positioned and supported in the casing 10 by the mold portion 50. Since the mold portion 50 is formed, two distances L1, L2 between two connection portions 30 becomes long. The distance L1, L2 is defined along with the inside electric wires 21, as shown in FIG. 1. Therefore, even if the fuel penetrates between the mold portion 50 and the inside electric wires 21, the wires 21 disposed between the connection portions 30 do not short-circuit since the distance L1, L2 is long. The detailed description according to the distance L1, L2 is described later.

Figure 2:
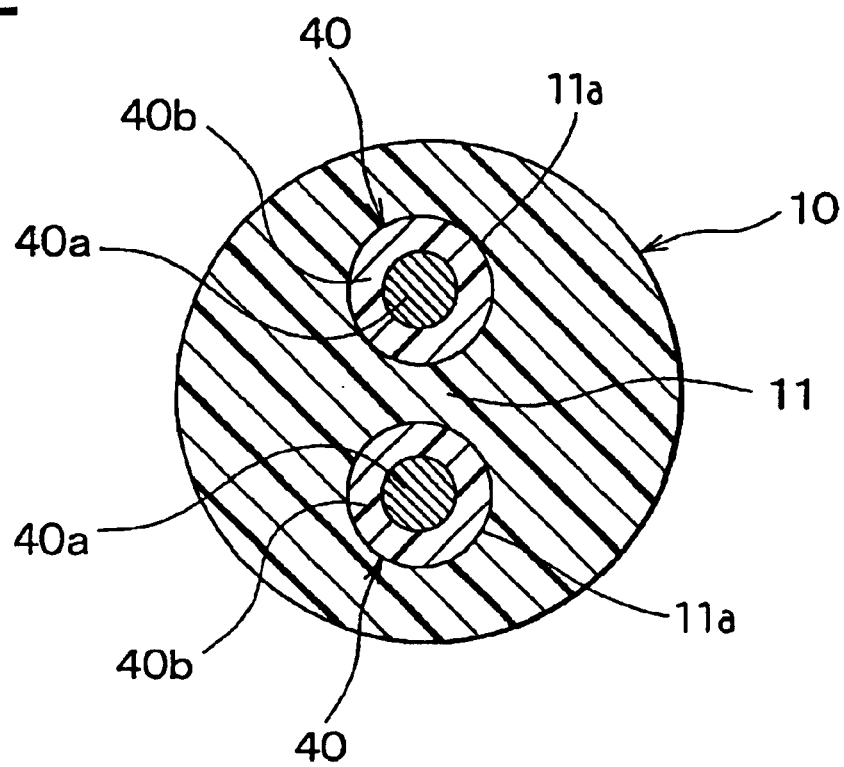
FIG. 2 is a cross-sectional view showing the sensor taken along line II—II in FIG. 1, according to the preferred embodiment.

Here, the sensor 1 has a cross-section shown in FIG. 2. As shown in FIG. 2, in the second part B of the casing 10, the casing 10 includes an insert portion 11 with a pair of insert holes 11a. The insert portion 11 and the casing 10 are formed integrally with resin. Each outside electric wire 40 is inserted into the insert hole 11a, respectively. It is preferred that the diameter of the insert hole 11a is set to be equal to or a little larger than the diameter of the outside electric wire 40. Therefore, the outside electric wire 40 is inserted into the insert hole 11a loosely or moderately. The insert portion 11 further includes a separation portion 12, as shown in FIG. 1. The separation portion 12 and the casing 10 are formed integrally with resin. The separation portion 12 extends to the first part A of the casing 10 so that the separation portion 12 separates between two inside electric wires 21.

Next, the sensor 1 is manufactured as follows. At first, the casing 10 together with the insert portion 11 and the separation portion 12 is formed of resin with using an injection molding method.

Then, the two outside electric wires 40 are inserted and connected to the detector 20 with the connection portion 30. The detector 20, the connection portion 30 and the outside electric wires 40 are inserted into the casing 10 from an opening of 10a the casing 10, which is disposed on the first part A side, i.e., disposed on the left side in FIG. 1. Further, each outside electric wire 40 is inserted into the insert hole 11a until the connection portion 30 contacts the protrusion 10b of the casing 10. Thus, the outside electric wire 40 is mounted in the second part B of the casing 10, and the detector 20 and the connection portion 30 is mounted in the first part A of the casing 10.

In the above method, the two outside electric wires 40 are connected to the detector 20 with the connection portion 30 before the outside electric wires 40 are inserted into the casing 10. However, firstly, a terminal or a connector (not shown) is connected to one end of each outside electric wire 40. Then, the other end of the outside electric wire 40 is inserted into the casing 10 from the insert hole 11a of the insert portion 11, which is disposed on the second part B side, i.e., disposed on the right side in FIG. 1. After that, the detector 20 is connected to the outside electric wire 40 with the connection portion 30. Then, each outside electric wire 40 is pulled through the insert hole 11a until the connection portion 30 contacts the protrusion 10b of the casing 10. Thus, the outside electric wire 40 is mounted in the second part B of the casing 10, and the detector 20 and the connection portion 30 is mounted in the first part A of the casing 10.

Next, while the detector 20, the connection portion 30 and the outside electric wire 40 are inserted in the casing 10, the resin composing the mold portion 50 is injected into the casing 10 from the opening 10a of the casing 10, so that the casing 10, specifically, the casing 10 in the first part A is filled with the resin. Accordingly, the resin forms the mold portion 50 between the detector 20 or the connection portion 30 and the casing 10. Therefore, the casing 10 covers both of the mold portion 50 and the outside wires 40 watertightly. Thus, the sensor 1 is completed.

Two outside electric wires 40 inserted into the insert holes 11a are separated with the separation portion 11 made of resin. Therefore, the distance L1 between the connection portions 30 becomes long. Specifically, the distance L1 is defined as a distance between two exposed parts of the outside electric wires 40 along with the outside electric wires 40. Here, the lead wire 40a is exposed from the insulation tube 40b so that the lead wire 40a connects to the connection portion 30. Therefore, part of the lead wire 40a between the connection portion 30 and the insulation tube 40b is exposed so that the lead wire 40a has an exposed part.

Even if the fuel penetrates between the insert portion 11 and the insulation tube 40b, the wires 40 disposed between the connection portions 30 do not short-circuit easily since the distance L1 between the exposed parts of the outside electric wires 40 is long. Thus, even when part of the lead wire 40a is exposed from the insulation tube 40b, the exposed parts of the lead wires 40a do not short-circuit.

In the sensor 1, the mold portion 50 is only disposed in the first part A of the casing 10, and the mold portion 50 is not disposed in the second part B of the casing 10. Therefore, the mold portion 50 does not contact the insulation tube 40b. Thus, even if the insulation tube 40b is deformed in some cases, a deformation stress generated by the insulation tube 40b does not apply to the mold portion 50, so that the mold portion 50 is not cracked or damaged by the deformation stress of the insulation tube 40b.

Further, the separation portion 12 is formed in the insert portion 11, and the separation portion 12 extends to the first part A of the casing 1 so that the separation portion 12 separates between the inside electric wires 21. Therefore, the distance L2 between the connection portions 30 becomes long. Specifically, the distance L2 is defined as a distance between the exposed parts of the lead wires 40a along with the inside electric wires 21. Therefore, even if the fuel penetrates between the mold portion 50 and the separation portion 12, the wires 21 disposed between the connection portions 30 do not short-circuit through the exposed part of the lead wires 40a. Specifically, even when part of the lead wire 40a is exposed from the insulation tube 40b, the exposed parts of the lead wires 40a do not short-circuit.

Thus, the sensor 1 has a low possibility of short-circuit and no crack in the mold portion 50, so that the sensor 1 has high reliability.

Further, the insert portion 11 and the separation portion 12 are resin-molded integrally with the casing 10, so that the number of parts composing the sensor 1 can be reduced compared with a sensor, which is composed of individual parts of the insert portion 11, the separation portion and the casing 10, which are different parts. Therefore, the manufacturing cost of the sensor 1 is reduced.

(Modifications)

Although the mold portion 50 is formed with using the injection molding method, the mold portion 50 can be formed with other method such as a resin casting method.

Although the thermistor 22 is used for detecting the temperature of the fuel, other device such as resistance device for detecting temperature or a pair of thermocouples can be used as a temperature detecting device instead of the thermistor 22.

Although the sensor detects the temperature of the fuel, the sensor can be used for detecting temperature of other fluid such as insulation fluid (e.g., transmission oil).

Such changes and modifications are to be understood as being within the scope of the present invention as defined by the appended claims.

What is claimed is:

1. A temperature sensor comprising:
   a casing including a first part and a second part;
   a temperature detector for detecting temperature of fluid; and
   a pair of outside wires connecting to the temperature detector,
   wherein the casing further includes a mold portion and an insert portion,
   wherein the mold portion is disposed in the first part of the casing,
   wherein the insert portion is disposed in the second part of the casing, and includes a pair of holes for inserting the outside wires therein,
   wherein the temperature detector is disposed in the first part of the casing, and
   wherein each outside wire extends from the second part of the casing to an outside of the casing through one of the holes,
   wherein the mold portion is made of resin,
   wherein the first part has a distal end opposite to the insert portion, the distal end being opened,
   wherein the distal end of the first part is filled with the mold portion,
   wherein each outside wire includes a lead wire covered with an insulation tube so that the lead wire electrically connects to the temperature detector,
   wherein the detector is disposed in the mold portion so that the detector is fixed in the mold portion,
   wherein the temperature detector includes a detecting device and a pair of inside wires,
   wherein the detecting device connects to the outside wires through the inside wires,
   wherein the insert portion includes a separation portion,
   wherein the separation portion extends to the first part of the casing so that the separation portion separates between the inside wires, and
   wherein the inside wires are disposed in the mold portion so that the detector is fixed in the mold portion.

2. The sensor according to claim 1,
   wherein the first part is disposed on one side of the casing, and the second part is disposed on the other side of the casing, and
   wherein the casing is made of resin and has a cylindrical shape.

3. The sensor according to claim 1,
   wherein the casing, the insert portion and the separation portion are made of resin, and are integrated together.

4. The sensor according to claim 3,
   wherein the separation portion is disposed in the mold portion so that the separation portion is fixed in the mold portion, and
   wherein the casing covers the mold portion so that the mold portion is mounted in the casing.

5. The sensor according to claim 2,
   wherein the outside wire connects to the inside wire through a connection portion, and
   wherein the lead wire of the outside wire is exposed from the insulation tube at the connection portion.

6. The sensor according to claim 5,
   wherein each lead wire of the outside wires is exposed from the insulation tube at the connection portion so that the lead wire includes an exposed part, and
   wherein the separation portion separates the exposed parts of the lead wires so that the exposed parts do not short-circuit.

7. The sensor according to claim 6,
   wherein the casing covers both of the mold portion and the outside wire water-tightly.

8. The sensor according to claim 1,
   wherein the mold portion is formed with an injection molding method.

9. A method for manufacturing a temperature sensor for detecting temperature of fluid, the method comprising the steps of:
   forming a casing integrally together with an insert portion having a pair of holes, the casing including a first part and a second part;
   connecting a pair of outside wires to a temperature detector for detecting the temperature of the fluid;

inserting the outside wires into the holes of the insert portion, respectively, so that the outside wires are mounted in the second part of the casing, and the temperature detector is mounted in the first part of the casing after the step of connecting a pair of outside wires;

filling with resin into the first part of the casing so that a mold portion is formed; and wherein the outside wire is connected electrically to the temperature detector through a lead wire disposed in the outside wire, wherein each outside wire extends from the second part of the casing to an outside of the casing through one of the holes, wherein the first part has a distal end, which is opposite to the insert position, and is opened, wherein the first part is filled with resin from the distal end opened in the step of filling with resin, wherein the lead wire is covered with an insulation tube, and wherein the detector is fixed in the mold portion in the step of filling with resin.

10. The method according to claim 9, wherein the first part is disposed on one side of the casing, and the second part is disposed on the other side of the casing, and wherein the casing is made of resin and has a cylindrical shape.

11. The method according to claim 9, wherein the temperature detector includes a detecting device and a pair of inside wires, wherein the detecting device connects to the outside wires through the inside wires, wherein the insert portion includes a separation portion, wherein the separation portion extends to the first part of the casing so that the separation portion separates between the inside wires, and wherein the inside wires are disposed in the mold portion so that the detector is fixed in the mold portion.

12. The method according to claim 11, wherein, in the step of forming the casing, the casing, the insert portion and the separation portion are integrally molded with resin.

13. The method according to claim 12, wherein the separation portion is disposed in the mold portion so that the separation portion is fixed in the mold portion, and wherein the casing covers the mold portion so that the mold portion is mounted in the casing.

14. The method according to claim 10, wherein the outside wire connects to the inside wire through a connection portion, and wherein the lead wire of the outside wire is exposed from the insulation tube at the connection portion.

15. The method according to claim 14, wherein each lead wire of the outside wires is exposed from the insulation tube at the connection portion so that the lead wire includes an exposed part, and wherein the separation portion separates the exposed parts of the lead wires so that the exposed parts do not short-circuit.

16. The method according to claim 15, wherein the casing covers both of the mold portion and the outside wire water-tightly.

17. The method according to claim 9, wherein the mold portion is formed with an injection molding method.

18. A method for manufacturing a temperature sensor for detecting temperature of fluid, the method comprising the steps of:

forming a casing integrally together with an insert portion having a pair of holes, the casing including a first part and a second part;

inserting a pair of outside wires into the holes of the insert portion, respectively;

connecting the pair of outside wires to a temperature detector for detecting the temperature of the fluid;

pulling each outside wire through the hole of the insert portion so that the outside wires are mounted in the second part of the casing, and the temperature detector is mounted in the first part of the casing after the step of connecting a pair of outside wires; and filling with resin into the first part of the casing so that a mold portion is formed, wherein the first part has a distal end, which is opposite to the insert position, and is opened, and wherein the first part is filled with resin from the distal end opened in the step of filling with resin.

19. The method according to claim 18, wherein the first part is disposed on one side of the casing, and the second part is disposed on the other side of the casing, wherein the outside wire includes a lead wire covered with an insulation tube, wherein the casing is made of resin and has a cylindrical shape, wherein the mold portion is made of resin, wherein the temperature detector includes a detecting device and a pair of inside wires, wherein the detecting device connects to the outside wires through the inside wires, wherein the insert portion includes a separation portion, and wherein the separation portion extends to the first part of the casing so that the separation portion separates between the inside wires.

20. The method according to claim 19, wherein, in the step of forming the casing, the casing, the insert portion and the separation portion are integrally molded with resin, wherein the separation portion, the inside wires and the detector are disposed in the mold portion so that they are fixed in the mold portion, and wherein the casing covers the mold portion so that the mold portion is mounted in the casing.

21. The method according to claim 20, wherein the outside wire connects to the inside wire through a connection portion, wherein each lead wire of the outside wires is exposed from the insulation tube at the connection portion so that the lead wire includes an exposed part, wherein the separation portion separates the exposed parts of the lead wires so that the exposed parts do not short-circuit, and wherein the casing covers both of the mold portion and the outside wire water-tightly.

* * * * *

UNITED STATES PATENT AND TRADEMARK OFFICE
CERTIFICATE OF CORRECTION

PATENT NO.         : 6,918,696 B2
APPLICATION NO. : 10/752587
DATED                 : July 19, 2005
INVENTOR(S)       : Akihiko Hoshisashi et al.

It is certified that error appears in the above-identified patent and that said Letters Patent is hereby corrected as shown below:

Title Page

Please correct the named inventors in item (75) of the above above-identified Letters Patent to reflect to changes below:

(75) Akihiko Hoshisashi, Chita-gun, JAPAN
Seizaburou Kawashima, Anjo-city, JAPAN
Takeru Yamashita, Saitama-city, JAPAN
Takamasa Yoshihara, Saitama-city, JAPAN
Kaname Kato, Saitama-city, JAPAN Signed and Sealed this Twenty-eighth Day of October, 2008

JON W. DUDAS
*Director of the United States Patent and Trademark Office*